United States Patent [19]

Messina

[11] Patent Number: 5,519,910

[45] Date of Patent: May 28, 1996

[54] MOUSE BALL CLEANING DEVICE

[76] Inventor: John Messina, 507 Kubin Ct., Califon, N.J. 07830

[21] Appl. No.: 395,963

[22] Filed: Feb. 28, 1995

[51] Int. Cl.$^6$ ................................................ B08B 11/00
[52] U.S. Cl. ............................ 15/104.002; 15/104.001
[58] Field of Search .................. 15/104.002, 104.93, 15/104.001; 400/702

[56] References Cited

U.S. PATENT DOCUMENTS

| | | | |
|---|---|---|---|
| 2,394,855 | 2/1946 | Gould | 15/104.002 |
| 2,796,367 | 6/1957 | Brown . | |
| 2,800,215 | 7/1957 | Converse | 15/104.002 |
| 3,083,393 | 4/1963 | Nappi . | |
| 4,673,400 | 6/1987 | Chapin, Jr. | 15/104.92 |
| 4,713,274 | 12/1987 | Minor . | |
| 4,799,054 | 1/1989 | House . | |
| 5,217,781 | 6/1993 | Kuipers . | |

*Primary Examiner*—Edward L. Roberts, Jr.
*Attorney, Agent, or Firm*—Klauber & Jackson

[57] ABSTRACT

An assembly is provided which enables effective and rapid cleaning of computer mouse balls. The assembly includes a generally planar member, have a smooth low friction upper surface with a recessed well being formed at the member within the lateral periphery of same. The bottom of the well defines a plane which is parallel to the upper surface of the planar member and which is coated with an adhesive film. The planar member thereby defines a frame for the well so that the computer mouse may be positioned with its ball in the well in contact with the adhesive film, while the adjacent underlying body of the mouse is supported upon and slides freely upon the planar surface of the frame. This enable effective rolling of the ball in contact with the adhesive film to enable cleaning of the ball surface.

6 Claims, 1 Drawing Sheet

1
MOUSE BALL CLEANING DEVICE

BACKGROUND OF THE INVENTION

This invention relates generally to computer apparatus and accessories for use with same, and more specifically, relates to a device which is useful in the cleaning of mouse balls. The use of a mouse in connection with operation of a computer, as for example, a personal computer (or PC) has become a standard operating technique in the applicable art. This accessory is a handheld device which is operated upon an underlying flat surface as to allow the user of the computer to control the movement of a cursor or pointer on the computer display. In order to accurately position the said cursor, the user moves the mouse across the flat surface, which in turn acts to rotate a ball which projects from the lower surface of the mouse. This ball contacts and rolls upon the surface when the mouse is moved across it. The rotational movement of the mouse is converted into electrical signals by the rotation of rollers mounted within the interior of the mouse. A major problem which is familiar to users of the aforementioned apparatus, is that the ball portion of the mouse tends in a relatively short period to become dirty, as a result of frequent movement over the surface with which it must interact. Small particles, grease and the like tend to accumulate on the surface of the mouse, and in relatively short order will cause erratic movement of the cursor which the mouse controls. Standard procedure to remedy this normally involves disassembly of the mouse, and separate cleaning of the ball component, an operation which is time-consuming and somewhat difficult, particularly for the mechanically unskilled users which have become more and more common as the use of computers spreads to general office use. Furthermore, because of the inconvenience and difficulties of such cleaning (e.g. the need to disassemble the mouse, in some instances by use of a special tool, then use solvents or the like, dry the components and reassemble) it is common to delay cleaning for as long as possible, with resulting inaccuracies and inefficiency in use of the mouse at the computer.

Pursuant to the foregoing, it may be regarded as an object of the present invention, to provide a device which enables effective and rapid cleaning of computer mouse balls without disrupting the work in progress, without disassembling the mouse, and without the need for special tools.

A further object of the invention is to provide a device of the foregoing character which is of simple and economical manufacture, and which is readily used even by persons having relatively limited skills.

SUMMARY OF THE INVENTION

Now in accordance with the present invention, an assembly is provided which enables effective and rapid cleaning of computer mouse balls. The assembly includes a generally planar member, having a smooth low friction upper surface with a recessed well being formed at the member within the lateral periphery of same. The bottom of the well defines a plane which is parallel to the upper surface of the planar member, and which is coated with an adhesive film. The planar member thereby defines a frame for the well so that the computer may be positioned with its ball in the well in contact with the adhesive film, while the adjacent underlying body and/or "feet" of the mouse are supported upon and slides freely upon the planar surface of the frame. This enable effective rolling of the ball in contact with the adhesive film to enable cleaning of the ball surface. The well preferably has a depth of between 0.019 and 0.035 inches, a width of about one inch, and a length of at least 3 inches. By "feet" is meant the slight low friction projections which are commonly provided at spaced points about the underlying body of the mouse in order to facilitate sliding of the mouse over a support surface. In a preferable construction, the assembly may be formed from a cardboard base piece which is coated with the adhesive film, and an adherent overlying cardboard coverpiece which has a cutout defining the side walls of the well. The cutout is typically of rectangular shape, and the adhesive film at the bottom of the well is of the type commonly used for lint removing devices and the like, i.e. it possesses a mild tackiness which causes dirt and particulate matter to readily adhere to same as the mouse ball is rolled over the adhesive, while at the same time the adhesive is not detached from the well; i.e. it is preferentially adherent to the bottom of the well so that it will not transfer to the mouse ball. Conventional well-known adhesives can be employed for this purpose, as for example, an adhesive material made from a styrene isoprene rubber, with hydrocarbon tackifiers and aromatic/aliphatic oils.

BRIEF DESCRIPTION OF DRAWINGS

The invention is diagrammatically illustrated by way of example in the drawings appended hereto in which.

DESCRIPTION OF PREFERRED EMBODIMENT

Figure 1:
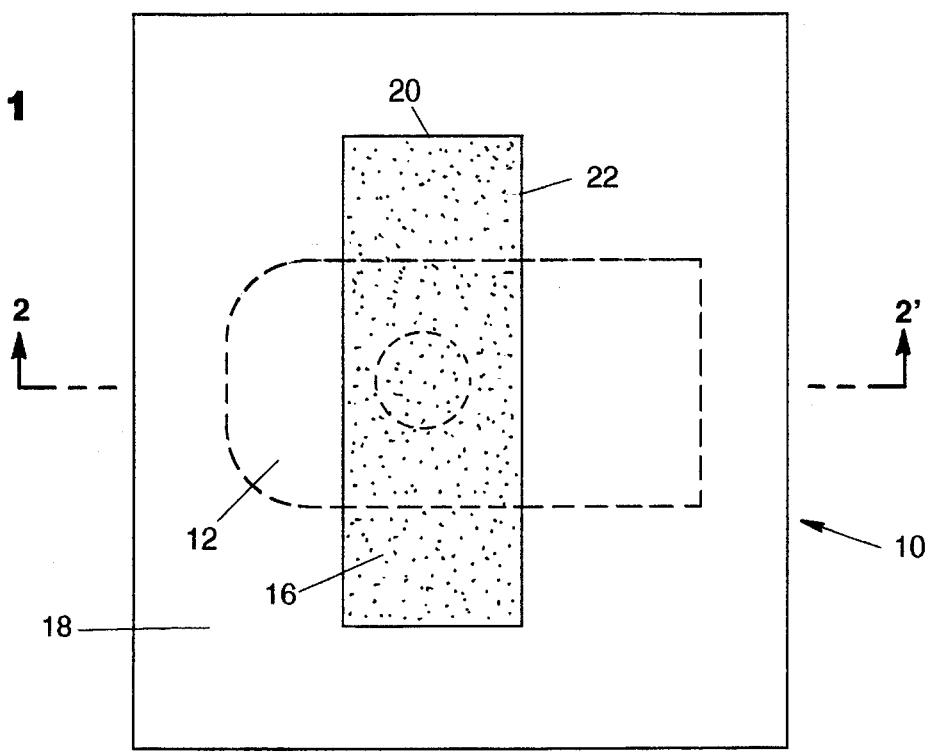
FIG. 1 is a top plan view of a mouse ball cleaning assembly in accordance with the present invention.

In FIG. 1, a top plan view appears of a mouse ball cleaning device or assembly 10 in accordance with the present invention. This view may be examined simultaneously with the transverse cross sectional view of FIG. 2, and the similar view of FIG. 3 in which the outline of a computer mouse 12 is shown in conjunctive use with the device 10.

Figure 2:
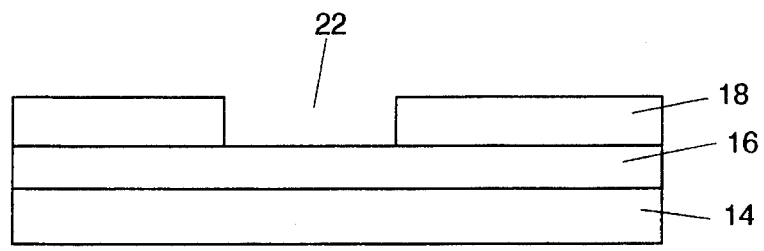
FIG. 2 is a cross sectional view of the device of FIG. 1, taken along the line 2–2'.

Referring to the said Figures, the device 10 includes in the preferred embodiment shown, a base piece 14 of cardboard or similar material which is overcoated with an adhesive film 16 of the type previously referred to. These two elements are in turn overlaid by a cardboard coverpiece 18 which may comprise the same material as the base piece. The coverpiece 18, as may be best seen in FIG. 1 includes a cutout portion 20 which may be of rectangular shape. This cutout portion extends through the coverpiece 18, so as seen in FIG. 2, the adhesive film 16 is thereby exposed at the bottom of the cutout. The cutout portion 20 is seen to be interior of the edges of the coverpiece 18, in consequence of which the coverpiece defines a frame for the cutout. The cutout in turn is seen to thereby define a well 22 the bottom of which is accordingly provided with the adhesive film 16.

Figure 3:
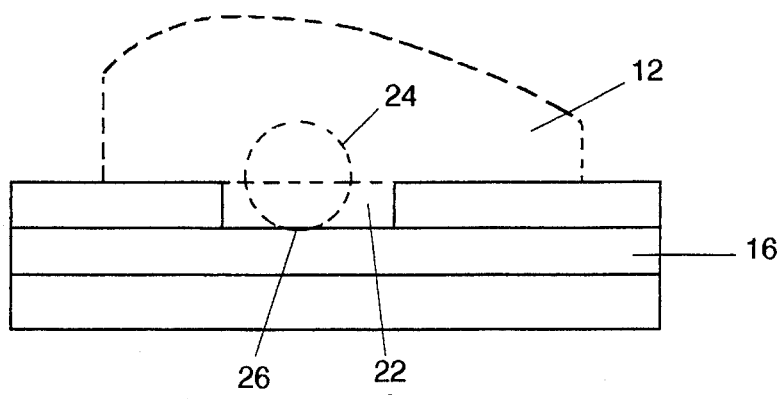
FIG. 3 is a somewhat diagrammatic view similar to FIG. 2, but showing the outline of a computer mouse in the course of the cleaning operation utilizing the invention.

Pursuant to the invention, it will therefore be clear, as now shown in FIG. 3 (and in shadow in FIG. 1), that the computer mouse 12 may be positioned with its ball 24 distended in the well 22, in contact at point 26 with the adhesive film 16. At the same time, as seen in FIG. 1, the mouse 12 is so positioned that its underlying portions will be supported at the top surface of coverpiece 18, which is provided with a low friction smooth surface. This arrangement assures that the body of the mouse supported on the surface of coverpiece 18 may slide freely upon the frame formed by the coverpiece, to thereby enable effective rolling of the ball 24 in contact with the adhesive film to enable cleaning of the surface of ball 24.

In order to assure most effective operation of the present device, it is preferred that the depth of well 22 be in the range of 0.019 to 0.035 inches. This is to say that the thickness of coverpiece 18 should preferably correspond to this range. Such well depth will enable appropriate gravitational descent of the mouse ball 24 in order to assure proper contact with the adhesive film 16. The cutout portion 20 preferably should have a width of about 1 inch and a length of not less than about 3 inches. In a preferable mode of use, the mouse is positioned with the mouse ball 24 in contact with the adhesive film 16, and the mouse then moved so that a tortious path is traced by the mouse on the film, a particularly desirable path having the general configuration of the numeral 8 (the "8" being positioned on its side in the view of FIG. 1). This assures that all portions of the mouse ball 24 will be effectively and quickly cleaned.

It will be appreciated that in practice, the device 10 can be formed of the laminate shown in the preferred embodiment; but it is also within the province of the invention for the assembly to be formed from a single substrate in which the appropriate well has been formed. In practice, and in order to provide efficiency at the point of sale, the device 10 may include a protective cover over the adhesive film 16 at well 22, which protective film can be removed before use. Alternatively, a plurality of devices 10 can be packaged in overlying relationship to enable use of the successive units by the user. In this instance, the protective covering for the adhesive film may not be required, since the overlying relationship of the plural units protects the underlying units carrying the adhesive film. The uppermost unit can in this instance be protected by the packaging for the plural units, i.e. if ten units are sold in a package, the protective packaging will assure that topmost unit has its adhesive film protected, and all other units will be protected by the respective overlying unit. If upon the user of device 10 completing the cleaning of mouse ball 24, and prior to discarding the device, the adhesive film 16 can be used for a further valuable purpose. Specifically such film can be brought into contact with the "feet" of the mouse, to effect efficient and thorough cleaning of these elements, upon which the mouse rides and which are subject to accumulating of dirt and debris during use of the mouse.

While the present invention has set forth in terms of specific embodiments thereof, it will be understood in view of the present disclosure, that numerous variations upon the invention are now enabled to those skilled in the art, which variations yet reside within the scope of the present teaching. Accordingly, the invention is to be broadly construed, and limited only by the scope and spirit of the claims now appended hereto.

What is claimed is:

1. An assembly for effective and rapid cleaning of computer mouse balls, comprising in combination:

a generally planar member having a smooth low friction upper surface; and a recessed well having a bottom being formed at said member within the periphery of same, the said bottom of said well defining a plane which is parallel to the upper surface of said planar member and which is coated with an adhesive film; said well having a depth of between 0.019 and 0.035 inches, a width of about 1 inch, and a length of at least 3 inches;

the upper surface of said planar member thereby defining a frame for said well, whereby the computer mouse may be positioned with its ball distended in said well in contact with the adhesive film, while the adjacent body of the mouse is supported upon and slides freely upon the planar surface of said frame, to enable effective rolling of the ball in contact with the adhesive film to enable cleaning of the ball surface.

2. An assembly in accordance with claim 1 wherein said generally planar member is formed from a cardboard base piece which is coated with a said adhesive film, and an adherent overlying cardboard coverpiece which has a cutout defining the side walls of said well.

3. An assembly in accordance with claim 2, wherein the cutout is of rectangular shape.

4. An assembly for effective and rapid cleaning of a computer mouse ball, comprising in combination:

a cardboard base piece which is coated with an adhesive film; and a cardboard coverpiece which overlies said base piece and is adhered thereto by said adhesive film;

said coverpiece having a cutout portion interior of the edges of same, so that the coverpiece defines a frame for the cutout; said cutout thereby defining a well, the bottom of which is provided with said adhesive film; whereby the computer mouse may be positioned with its ball in said well in contact with the adhesive film while the adjacent body of the mouse is supported upon and slides freely upon said the said frame, to enable effective rolling of the ball in contact with the adhesive film to enable cleaning of the ball surface.

5. An assembly in accordance with claim 4, wherein the thickness of said coverpiece and thereby the depth of said well is between 0.019 and 0.035 inches.

6. An assembly in accordance with claim 4, wherein said cutout has a width of about 1 inch and a length of at least 3 inches.

* * * * *